United States Patent
Ajagekar et al.

(10) Patent No.: US 11,902,260 B2
(45) Date of Patent: Feb. 13, 2024

(54) SECURING CONTROL/USER PLANE TRAFFIC

(71) Applicant: Cisco Technology, Inc., San Jose, CA (US)

(72) Inventors: Pravin Appaji Ajagekar, Pune (IN); Ravi Shekhar, Pune (IN); Nithin Chitta, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 39 days.

(21) Appl. No.: 17/391,199

(22) Filed: Aug. 2, 2021

(65) Prior Publication Data

US 2023/0052655 A1  Feb. 16, 2023

(51) Int. Cl.
*H04L 9/40* (2022.01)
*H04L 67/141* (2022.01)
*H04W 12/037* (2021.01)
*H04W 12/033* (2021.01)

(52) U.S. Cl.
CPC ........ *H04L 63/0428* (2013.01); *H04L 63/029* (2013.01); *H04L 67/141* (2013.01); *H04W 12/033* (2021.01); *H04W 12/037* (2021.01)

(58) Field of Classification Search
CPC . H04L 63/0428; H04L 63/029; H04L 67/141; H04W 12/033; H04W 12/037
See application file for complete search history.

(56) References Cited

U.S. PATENT DOCUMENTS

| | | | | |
|---|---|---|---|---|
| 8,774,759 B2* | 7/2014 | He | ...... | H04W 12/037 455/410 |
| 10,455,414 B2* | 10/2019 | Lee | ...... | H04L 63/06 |
| 2010/0067698 A1* | 3/2010 | Hahn | ...... | H04L 63/123 380/270 |
| 2013/0236016 A1* | 9/2013 | Zhang | ...... | H04W 12/033 380/270 |
| 2014/0208094 A1* | 7/2014 | Rajsic | ...... | H04L 63/0428 713/152 |

(Continued)

FOREIGN PATENT DOCUMENTS

| | | | | |
|---|---|---|---|---|
| EP | 3641423 A1 * | 4/2020 | ...... | H04W 48/16 |
| WO | WO-2009046052 A2 * | 4/2009 | ...... | H04L 1/0026 |
| WO | 2018009340 A1 | 1/2018 | | |
| WO | 2020148330 A1 | 7/2020 | | |

OTHER PUBLICATIONS

Caprolu et al.; "FORTRESS: An Efficient and Distributed Firewall for Stateful Data Plane SDN", 2019, Security and Communication Networks, pp. 2-16. (Year: 2019).*

(Continued)

*Primary Examiner* — Matthew Smithers
(74) *Attorney, Agent, or Firm* — Edell, Shapiro & Finnan, LLC

(57) ABSTRACT

A network node selectively encrypts messages between a user plane node and a control plane node in a network system. The user plane node and the control plane node negotiate a connection and indicate an encryption level for the connection. The encryption level is selected from an Information Element (IE) level, a message level, or a feature level. The user plane node and the control plane node selectively encrypt at least a portion of the messages between the user plane node and the control plane node based on the encryption level for the connection.

20 Claims, 11 Drawing Sheets

(56) References Cited

U.S. PATENT DOCUMENTS

| | | | |
|---|---|---|---|
| 2014/0355762 A1* | 12/2014 | Zhang | H04W 12/0433 380/270 |
| 2018/0220327 A1 | 8/2018 | Karampatsis et al. | |
| 2018/0376384 A1* | 12/2018 | Youn | H04W 36/0022 |
| 2019/0028515 A1* | 1/2019 | Horn | H04W 12/10 |
| 2019/0068625 A1* | 2/2019 | Alfano | H04L 43/16 |
| 2019/0082325 A1* | 3/2019 | Muhanna | H04L 9/3242 |
| 2019/0141169 A1* | 5/2019 | Ni | H04L 69/329 |
| 2019/0223022 A1* | 7/2019 | Torvinen | H04L 9/0844 |
| 2019/0387401 A1* | 12/2019 | Liao | H04W 28/0289 |
| 2020/0015088 A1* | 1/2020 | Luo | H04W 12/041 |
| 2020/0100102 A1* | 3/2020 | Xu | H04W 12/033 |
| 2020/0145432 A1 | 5/2020 | Verma et al. | |
| 2020/0252853 A1* | 8/2020 | Shi | H04W 48/10 |
| 2020/0344666 A1* | 10/2020 | Wang | H04L 69/324 |
| 2021/0160228 A1* | 5/2021 | Scott | H04W 4/025 |
| 2021/0385648 A1* | 12/2021 | Amend | H04L 63/0272 |
| 2022/0263812 A1* | 8/2022 | Lee | H04L 63/0428 |

OTHER PUBLICATIONS

Peyravian et al.; "Asynchronous Transfer Mode Securi/y", 1997, IEEE, pp. 34-40. (Year: 1997).*

3GPP, "3rd Generation Partnership Project; Technical Specification Group Services and System Aspects; Network Domain Security (NDS); IP network layer security (Release 16)", 3GPP TS 33.210 V16.4.0, Jul. 2020, 27 pages.

3GPP, "3rd Generation Partnership Project; Technical Specification Group Core Network and Terminals; Restoration procedures; (Release 17)", 3GPP TS 23.007 V17.0.0, Dec. 2020, 113 pages.

3GPP, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3; (Release 17)", 3GPP TS 29.274 V17.1.1, Mar. 2021, 405 pages.

3GPP, "3rd Generation Partnership Project; Technical Specification Group Core Network and Terminals; Interface between the Control Plane and the User Plane Nodes; Stage 3 (Release 17)", 3GPP TS 29.244 V17.0.0, Mar. 2021, 326 pages.

Positive Technologies, "5G Standalone core security research", retrieved from Internet May 10, 2021, positive-tech.com, 21 pages.

B. Campbell et al., "Securing Session Initiation Protocol (SIP) based Messaging with S / MIME draft-campbell-sip-messaging-smime-01", Network Working Group, Nov. 29, 2017, 12 pages.

Cisco, "GPRS Tunneling Protocol V2 Support", retrieved from Internet May 10, 2021, cisco.com, 14 pages.

* cited by examiner

SECURING CONTROL/USER PLANE TRAFFIC

TECHNICAL FIELD

The present disclosure relates to security in network systems, particularly in network deployments with separate user plane and control plane functions.

BACKGROUND

Communication between nodes of a network system is typically via User Datagram Protocol (UDP) messages, such as Packet Forwarding and Control Protocol (PFCP) messages or General Packet Radio Service (GPRS) Tunneling Protocol (GTP) messages. These messages do not inherently include methods for encryption and sender authentication, which may expose security vulnerabilities that result in disclosure of subscriber information, spoofing of messages, and/or Denial-of-Service (DOS) attacks on the network.

Currently, network operators may secure UDP-based communication with Access Control List (ACL)-based Internet Protocol Security (IPSec) between network nodes. Using an ACL policy, a network operator may define packet attributes (e.g., IP address, port number, protocol type, etc.), which flexibly define IPSec policies. For instance, PFCP destination port 8805 may be configured to create an IPSec tunnel that encrypts all traffic between control plane nodes and user plane nodes. Alternatively, network operators may use a firewall-based encryption solution to encrypt traffic between nodes. In a further example, a network operator may secure Session Initiation Protocol (SIP)-based messaging with Secure/Multipurpose Internet Mail Extensions (S/MIME).

DESCRIPTION OF EXAMPLE EMBODIMENTS

Overview

A computer implemented method is provided for a network node to selectively encrypt messages in a network system. The method includes negotiating a connection between a user plane node and a control plane node of the network system. The method also includes indicating an encryption level for the connection between the user plane node and the control plane nose. The encryption level is selected from an IE level, a message level, or a feature level. The method further includes selectively encrypting at least a portion of messages between the user plane node and the control plane node based on the encryption level for the connection.

EXAMPLE EMBODIMENTS

Mobile operators experience an increasing number of attacks exploiting vulnerabilities by abusing Packet Forwarding Control Protocol (PFCP) or General Packet Radio Service (GPRS) Tunneling Protocol (GTP) interfaces. These attacks impact subscribers as well as carrier-class operators, and may be exacerbated in roaming scenarios in which traffic flows between a visited networks and a home network. Attackers may eavesdrop on communications to harvest network information, obtain subscriber information, and/or exfiltrate confidential data enabling criminal activity.

Different nodes of a communications network, such as control plane nodes and user plane nodes, may be geographically separated and connected by a public network. Additionally, cloud-based network deployments may be managed by separate operations teams with nodes that are connected by a public network. The communications across the public network may be protected by Access Control List (ACL)-based Internet Protocol Security (IPSec) tunnels. However, ACL-based policies do not allow for selective message encryption, which may increase the Central Processing Unit (CPU) requirements for software-based encryption or increase requirements for dedicated hardware for hardware-based encryption. Additionally, as the number of user plane nodes increases, each control plane node maintains an increasing number of IPSec tunnels.

To enable network nodes to selectively encrypt communications (e.g., between control plane nodes and user plane nodes), the techniques presented herein enable each network node to negotiate an encryption level with other nodes to balance the security needs for encryption with the processing power needs of the network nodes.

Figure 1:
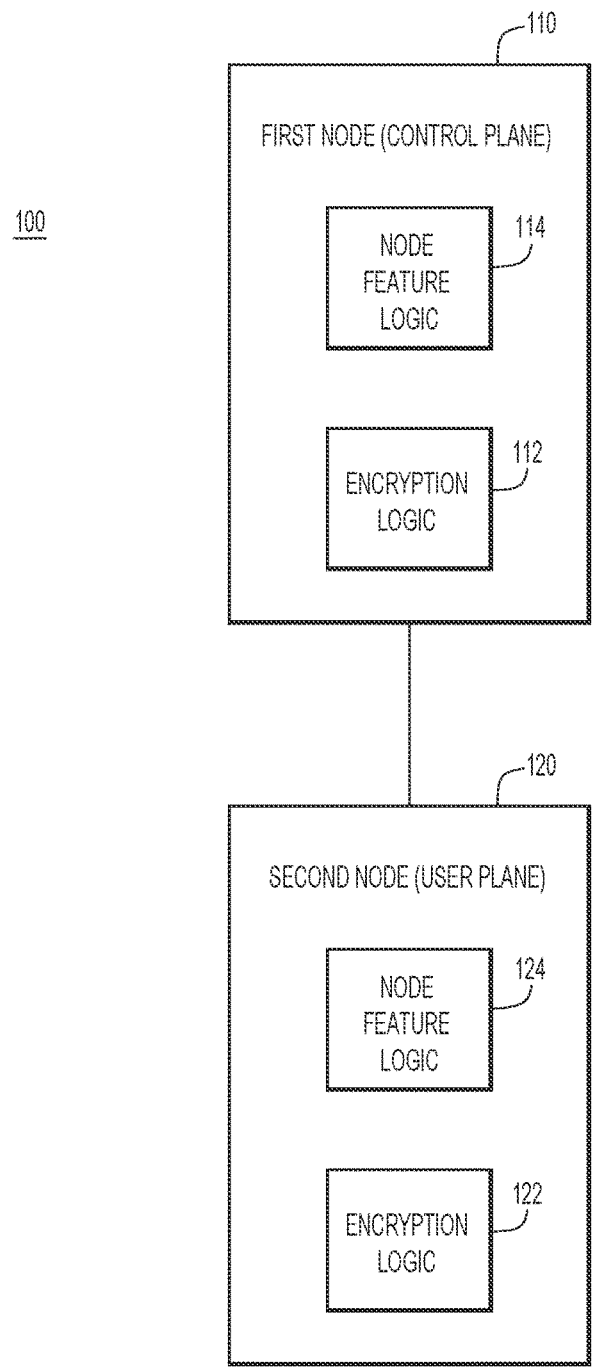
FIG. 1 is a simplified block diagram of a network system, according to an example embodiment.

Referring now to FIG. 1, a simplified block diagram illustrates nodes of a network system 100. The network system 100 includes a first node 110 (e.g., a control plane node) with encryption logic 112 and node feature logic 114. In one example, the first node 110 may be a Third Generation Partnership Project (3GPP) Session Management Function (SMF) of a Fifth Generation (5G) implementation or a Serving Gateway (SGW) of a Fourth Generation (4G)/Long Term Evolution (LTE) implementation of the network system 100.

The encryption logic 112 enables the first node 110 to selectively encrypt communications with other nodes in the network system 100. The node feature logic 114 enables the first node 110 to associate specific messages with features of the first node 110. For instance, the first node 110 may associate particular messages with features such as usage reporting, load monitoring, or lawful interception. Associating specific messages with a feature enables the first node 110 to selectively encrypt only the messages associated with a particular feature.

The network system 100 also includes a second node 120 (e.g., a user plane node) with encryption logic 122 and node feature logic 124. In one example, the second node 120 may be a User Plane Function (UPF) of a 5G implementation or a Packet Data Network (PDN) Gateway (PGW) of a 4G/LTE implementation of the network system 100. In another example, the second node 120 may be another control plane entity, such as a Mobility Management Entity (MME).

The encryption logic 122 enables the second node 120 to selectively encrypt communications with other nodes in the network system 100, such as first node 110. The node feature logic 124 enables the second node 120 to associate specific messages with features of the second node 120. For instance, the second node 120 may associate particular messages with features such as usage reporting, load monitoring, or lawful interception. Associating specific messages with a feature enables the second node 120 to selectively encrypt only the messages associated with a particular feature.

In one example, the encryption logic 112 and the encryption logic 122 may use a public/private key pair to encrypt some or all of the messages between the first node 110 and the second node 120. The encryption logic 112 may use a public key to encrypt messages sent from the first node 110 to the second node 120. The encryption logic 122 would use the corresponding private key to decrypt the message from the first node 110. Similarly, the encryption logic 122 may use a public key to encrypt messages sent from the second node 120 to the first node 110. The encryption logic 112 would use the corresponding private key to decrypt the message from the second node 120. Alternatively, the encryption logic 112 and the encryption logic 122 may encrypt messages using a symmetric cryptographic key that is provisioned on both the first node 110 and the second node 120.

In another example, the encryption logic 112 and the encryption logic 122 may select a cryptographic key from a set of keys or key pairs. Selecting a cryptographic key from a set of keys enables the encryption logic 112 and the encryption logic 122 to support a key rotation mechanism. The encryption logic 112 and the encryption logic 122 may be provisioned with the same sets of keys or key pairs, and use the same method for selecting a key to encrypt each message between the first node 110 and the second node 120. For instance, the first node 110 may hash a session identifier to determine which key among the set of keys to encrypt messages to send to the second node 120. The second node 120 will hash the same session identifier to select the corresponding key that decrypts the encrypted message from the first node 110.

In a further example, the network system 100 may include more than one control plane nodes (e.g., first nodes 110) and/or user plane nodes (e.g., second nodes 120). Additionally, the techniques presented herein may also encrypt messages between any two nodes in the network system 100. For instance, the techniques presented herein may encrypt messages between an SMF node and an Access and Mobility Management Function (AMF) node of a 5G implementation of network system 100.

Figure 2:
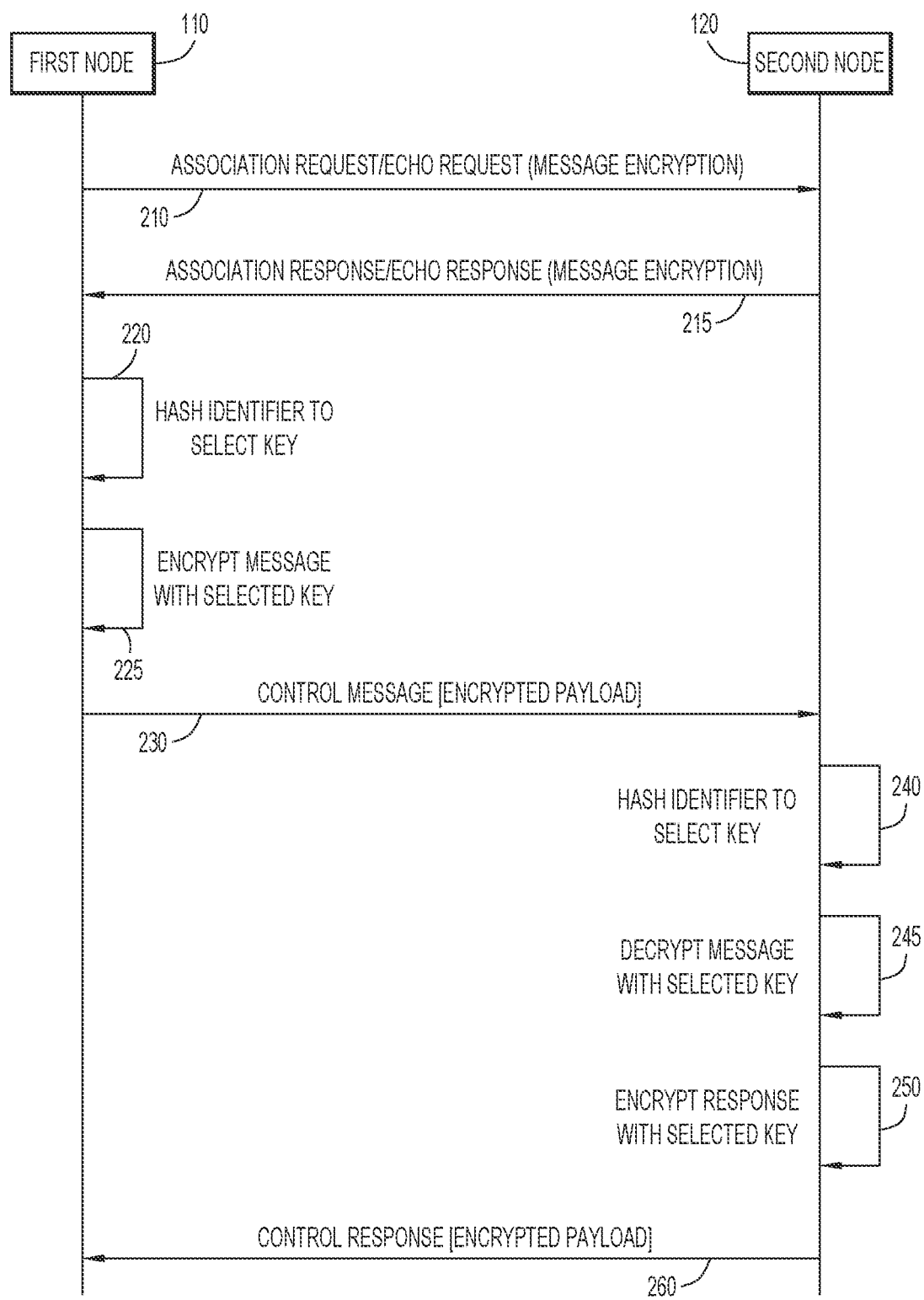
FIG. 2 is a message flow diagram illustrating messages within a network system to negotiate and send messages encrypted at an individual message level, according to an example embodiment.

Referring now to FIG. 2, a message flow diagram illustrates messages between a first node 110 and a second node 120 that negotiate a message level encryption and encrypt the messages between the two nodes. The first node 110 sends an association request 210 to the second node 120. In one example, the first node 110 may format the association request 210 as a PFCP Association Setup Request or a PFCP Association Update Request. Alternatively, the first node 110 may format the association request 210 as a GTP Echo Request. The association request 210 includes an indication of the capabilities of the first node 110, including that the first node 110 supports message level encryption. In one example, the association request 210 may indicate additional capabilities of the first node 110. For instance, the association request 210 may indicate that the first node 110 is capable of supporting message level encryption, Information Element (IE) level encryption for a specified set of IEs, and feature level encryption for a specified set of features.

The second node 120 responds to the association request 210 with an association response 215. In one example, the second node 120 may format the association response 215 as a PFCP Association Setup Response or a PFCP Association Update Response. Alternatively, the second node 120 may format the association response 215 as a GTP Echo Response. In other words, for some examples, the first node 110 and the second node 120 may format the messages sent in the connection between the first node 110 and the second node 120 may be formatted according to a PFCP format or a GTP format. The association response 215 confirms the level of encryption supported by both the second node 120 and the first node 110. For instance, the association response 215 may indicate that the payload of all messages between the first node 110 and the second node 120 will be encrypted, i.e., message level encryption.

After the first node 110 and the second node 120 have negotiated an association with a message level of encryption, the first node 110 selects a cryptographic key at 220. In one example, the first node 110 may select a cryptographic key from a set of keys based on identifier of the association between the first node 110 and the second node 120. For instance, the first node 110 may hash a session endpoint identifier or a tunnel endpoint identifier to select a cryptographic key.

The first node 110 encrypts the payload of a message at 225 and sends the message 230 with an encrypted payload to the second node 120. In one example, the selected cryptographic key is a public/private key pair, and the payload of the message 230 is encrypted with the public key of the key pair. In another example, the message 230 may be a PFCP Session Establishment Request. Alternatively, the message 230 may be a GTPC Create Session Request.

When the second node 120 receives the message 230 with the encrypted payload, the second node 120 hashes an identifier encoded in the message 230 to select the corresponding cryptographic key at 240. In one example, the identifier is the same identifier (e.g., session endpoint identifier or tunnel endpoint identifier) that the first node 110 hashed at 220 to select the cryptographic key. The second node 120 may select a corresponding private key associated with the public key that was used by the first node 110 to encrypt the payload of the message 230. The second node 120 decrypts the payload of the message 230 at 245 using the selected cryptographic key.

If the second node 120 has a response to the message 230, then the second node 120 will encrypt the payload of the response at 250 using the selected cryptographic key or key pair. The second node 120 sends the response 260 with an encrypted payload to the first node 110. In one example, the second node 120 uses the private key of a key pair to decrypt the payload of the message 230 and uses the public key of the key pair to encrypt the payload of the response 260. In another example, the response 260 may be a PFCP Session Establishment Response. Alternatively, the response 260 may be a GTPC Create Session Response.

In one example, the association request 210 and association response 215 may be a Packet Forwarding Control Protocol (PFCP) association setup or update exchange between a control plane node (e.g., first node 110) to a user plane node (e.g., second node 120). In the example of FIG. 2, the first node 110 initiates the association setup or update exchange, but the association may also be initiated from the second node 120. In other words, either the control plane node or the user plane node may initiate the association setup or update exchange.

The first node 110 may apply a hashing algorithm an a Session Endpoint Identifier (SEID) present in the PFCP header to select the cryptographic key. If the SEID of the PFCP header is zero, then the first node 110 may apply the hashing algorithm to a sequence number in the PFCP header. The first node 110 may set a flag in the PFCP header of the message 230 to indicate that the payload of the message 230 is encrypted.

octets 7 to 7+n can be used to identify a list of encrypted IEs (if IE level encryption is enabled) and octets o to o+n can identify a list of feature(s) that are to be encrypted (if feature level encryption is enabled).

TABLE 1

| | CP Function Features | | | | | | | |
|---|---|---|---|---|---|---|---|---|
| | Bits | | | | | | | |
| Octets | 8 | 7 | 6 | 5 | 4 | 3 | 2 | 1 |
| 1 to 2 | Type = 89 (decimal) | | | | | | | |
| 3 to 4 | Length = n | | | | | | | |
| 5 | Supported Features | | | | | | | |
| 6 | Additional Supported Features | | | | | | | |
| 7 to 7 + n | List of encrypted IEs | | | | | | | |
| o to o + n | List of features to encrypt | | | | | | | |
| p to (p + 4) | These octet(s) is/are present only if explicitly specified | | | | | | | |

The list of features defined for CP PFCP interfaces may be extended to include IE level encryption, message level encryption, and feature level encryption as shown in Table 2, such that octet 6 can be used to identify the encryption level with bit 1 indicating IE level encryption, bit 2 indicating messages level encryption, and bit 3 indicating feature level encryption.

TABLE 2

| CP PFCP Features | | | |
|---|---|---|---|
| Feature Octet/Bit | Feature | Interface | Description |
| 5/1 | LOAD | Sxa, Sxb, Sxc, N4 | Load Control is supported by the CP function. |
| 5/2 | OVRL | Sxa, Sxb, Sxc, N4 | Overload Control is supported by the CP function. |
| 5/3 | EPFAR | Sxa, Sxb, Sxc, N4 | The CP function supports the Enhanced PFCP Association Release feature. |
| 5/4 | SSET | N4 | SMF support of PFCP sessions successively controlled by different SMFs of a same SMF Set. |
| 5/5 | BUNDL | Sxa, Sxb, Sxc, N4 | PFCP messages bundling is supported by the CP function. |
| 5/6 | MPAS | N4 | SMF support for multiple PFCP associations from an SMF set to a single UPF. |
| 5/7 | ARDR | Sxb, N4 | CP function supports Additional Usage Reports in the PFCP Session Deletion Response. |
| 5/8 | UIAUR | Sxb, N4 | CP function supports the UE IP Address Usage Reporting feature, i.e., receiving and handling of UE IP Address Usage Information IE. |
| 6/1 | IE ENCRYPT | Sxa, Sxb, Sxc, N4 | PFCP IE level encryption is supported by the CP function. |
| 6/2 | MSG ENCRYPT | Sxa, Sxb, Sxc, N4 | PFCP Message level encryption is supported by the CP function. |
| 6/3 | FEATURE ENCRYPT | Sxa, Sxb, Sxc, N4 | PFCP Feature level encryption is supported by the CP function. |

The 3GPP specification 29.244 defines PFCP Association procedures. As port of the PFCP Association procedures, control plane nodes and user plane nodes may exchange node features. In the specification, each node may indicate support for a level of encryption during the PFCP Association or Update procedure. In one example, the Control Plane (CP) Function Features IE may be extended to indicate support for message level encryption, IE level encryption, a list of IEs to be encrypted, feature level encryption, and/or specific features to be encrypted. The extended CP Function Feature IE may be extended as shown in Table 1, such that Similarly, the User Plane (UP) Function Features IE may be extended to indicate support for message level encryption, IE level encryption, a list of IEs to be encrypted, feature level encryption, and/or specific features to be encrypted. The extended UP Function Feature IE may be extended as shown in Table 3, such that octets 11 to 11+n can be used to identify a list of encrypted IEs (if IE level encryption is enabled) and octets o to o+n can identify a list of feature(s) that are to be encrypted (if feature level encryption is enabled).

TABLE 3

UP Function Features

| Octets | Bits | | | | | | | |
|---|---|---|---|---|---|---|---|---|
| | 8 | 7 | 6 | 5 | 4 | 3 | 2 | 1 |
| 1 to 2 | Type = 89 (decimal) | | | | | | | |
| 3 to 4 | Length = n | | | | | | | |
| 5 to 6 | Supported Features | | | | | | | |
| 7 to 8 | Additional Supported Features 1 | | | | | | | |
| 9 to 10 | Additional Supported Features 2 | | | | | | | |
| 11 to 11 + n | List of encrypted IEs | | | | | | | |

TABLE 3-continued

UP Function Features

| Octets | Bits | | | | | | | |
|---|---|---|---|---|---|---|---|---|
| | 8 | 7 | 6 | 5 | 4 | 3 | 2 | 1 |
| o to o + n | List of features to encrypt | | | | | | | |
| p to (p + 4) | These octet(s) is/are present only if explicitly specified | | | | | | | |

The list of features defined for UP PFCP interfaces may be extended to include IE level encryption, message level encryption, and feature level encryption as shown in Table 4, such that bits 2-4 of octet 10 can be used to identify the encryption level with bit 2 indicating IE level encryption, bit 3 indicating messages level encryption, and bit 4 indicating feature level encryption.

TABLE 4

UP PFCP Features

| Feature Octet/Bit | Feature | Interface | Description |
|---|---|---|---|
| 5/1 | BUCP | Sxa, N4 | Downlink Data Buffering in CP function is supported by the UP function. |
| 5/2 | DDND | Sxa, N4 | The buffering parameter 'Downlink Data Notification Delay' is supported by the UP function. |
| 5/3 | DLBD | Sxa, N4 | The buffering parameter 'DL Buffering Duration' is supported by the UP function. |
| 5/4 | TRST | Sxb, Sxc, N4 | Traffic Steering is supported by the UP function. |
| 5/5 | FTUP | Sxa, Sxb, N4 | F-TEID allocation/release in the UP function is supported by the UP function. |
| 5/6 | PFDM | Sxb, Sxc, N4 | The PFD Management procedure is supported by the UP function. |
| 5/7 | HEEU | Sxb, Sxc, N4 | Header Enrichment of Uplink traffic is supported by the UP function. |
| 5/8 | TREU | Sxb, Sxc, N4 | Traffic Redirection Enforcement in the UP function is supported by the UP function. |
| 6/1 | EMPU | Sxa, Sxb, N4 | Sending of End Marker packets is supported by the UP function. |
| 6/2 | PDIU | Sxa, Sxb, Sxc, N4 | Support of PDI optimized signaling in UP. |
| 6/3 | UDBC | Sxb, Sxc, N4 | Support of UL/DL Buffering Control |
| 6/4 | QUOAC | Sxb, Sxc, N4 | The UP function supports being provisioned with the Quota Action to apply when reaching quotas. |
| 6/5 | TRACE | Sxa, Sxb, Sxc, N4 | The UP function supports Trace. |
| 6/6 | FRRT | Sxb, N4 | The UP function supports Framed Routing. |
| 6/7 | PFDE | Sxb, N4 | The UP function supports a PFD Contents including a property with multiple values. |
| 6/8 | EPFAR | Sxa, Sxb, Sxc, N4 | The UP function supports the Enhanced PFCP Association Release feature. |
| 7/1 | DPDRA | Sxb, Sxc, N4 | The UP function supports Deferred PDR Activation or Deactivation. |
| 7/2 | ADPDP | Sxa, Sxb, Sxc, N4 | The UP function supports the Activation and Deactivation of Pre-defined PDRs. |
| 7/3 | UEIP | N4 | The UPF supports allocating UE IP addresses or prefixes. |
| 7/4 | SSET | N4 | UPF support of PFCP sessions successively controlled by different SMFs of a same SMF Set. |
| 7/5 | MNOP | Sxa, Sxb, Sxc, N4 | UPF supports measurement of number of packets which is instructed with the flag 'Measurement of Number of Packets' in a URR. |
| 7/6 | MTE | N4 | UPF supports multiple instances of Traffic Endpoint IDs in a PDI. |
| 7/7 | BUNDL | Sxa, Sxb, Sxc, N4 | PFCP message bundling is supported by the UP function. |
| 7/8 | GCOM | N4 | UPF support of 5G VN Group Communication. |
| 8/1 | MPAS | N4 | UPF support for multiple PFCP associations to the SMFs in an SMF set. |
| 8/2 | RTTL | N4 | The UP function supports redundant transmission at transport layer. |
| 8/3 | VTIME | Sxb, N4 | UPF support of quota validity time feature. |
| 8/4 | NORP | Sxa, Sxb, Sxc, N4 | UP function support of Number of Reports. |

TABLE 4-continued

UP PFCP Features

| Feature Octet/Bit | Feature | Interface | Description |
|---|---|---|---|
| 8/5 | IPTV | N4 | UPF support of IPTV service. |
| 8/6 | IP6PL | N4 | UE IPv6 address(es) allocation with IPv6 prefix length other than default/64; and Multiple UE IPv6 addresses allocation using multiple instances of the UE IP address IE in a same PDI or Traffic Endpoint, or using multiple PDIs or Traffic Endpoints with a different UE IP Address. |
| 8/7 | TSCU | N4 | Time Sensitive Communication is supported by the UPF. |
| 8/8 | MPTCP | N4 | UPF support of MPTCP Proxy functionality. |
| 9/1 | ATSSS-LL | N4 | UPF support of ATSSS-LL steering functionality. |
| 9/2 | QFQM | N4 | UPF support of per QoS flow per UE QoS monitoring. |
| 9/3 | GPQM | N4 | UPF support of per GTP-U Path QoS monitoring. |
| 9/4 | MT-EDT | Sxa | SGW-U support of reporting size of DL Data Packets. |
| 9/5 | CIOT | Sxb, N4 | UP function support of CIoT feature, e.g., small data packet rate enforcement. |
| 9/6 | ETHAR | N4 | UPF support of Ethernet PDU Session Anchor Relocation. |
| 9/7 | DDDS | N4 | UPF support of reporting the first buffered/ first discarded downlink data after buffering/ directly dropped downlink data for downlink data delivery status notification. |
| 9/8 | RDS | Sxb, N4 | UP function support of Reliable Data Service. |
| 10/1 | RTTWP | N4 | UPF support of RTT measurements towards the UE without PMF. |
| 10/2 | IE ENCRYPT | Sxa, Sxb, Sxc, N4 | PFCP IE level encryption is supported by the UP function. |
| 10/3 | MSG ENCRYPT | Sxa, Sxb, Sxc, N4 | PFCP Message level encryption is supported by the UP function. |
| 10/4 | FEATURE ENCRYPT | Sxa, Sxb, Sxc, N4 | PFCP Feature level encryption is supported by the UP function. |

To support the extension of the 3GPP specification to include encryption level notification, additional IEs may be defined to further specify the level of encryption. For instance, when IE level encryption has been specified, an new IE may list the IEs to be encrypted, as shown in Table 5.

TABLE 5

New IE - List of Encrypted IEs

| Octets | Bits | | | | | | | | Content |
|---|---|---|---|---|---|---|---|---|---|
| | 8 | 7 | 6 | 5 | 4 | 3 | 2 | 1 | |
| 1 to 2 | Type = X (decimal) |||||||||
| 3 to 4 | Length = n |||||||||
| 5 | Number of encrypted IEs (k) |||||||||
| 6 to (6 + n) | List of k PFCP IE Type values |||||||||
| m to (m + 4) | These octet(s) is/are present only if explicitly specified |||||||||

Similarly, to support feature level encryption, a new IE may list specific features that will cause messages associated with the specific features to be encrypted, as shown in Table 6.

TABLE 6

New IE - List of Encrypted features

| Octets | Bits | | | | | | | | Content |
|---|---|---|---|---|---|---|---|---|---|
| | 8 | 7 | 6 | 5 | 4 | 3 | 2 | 1 | |
| 1 to 2 | Type = X (decimal) |||||||||
| 3 to 4 | Length = n |||||||||
| 5 | Number of features |||||||||
| 6 to (6 + n) | List of features |||||||||
| m to (m + 4) | These octet(s) is/are present only if explicitly specified |||||||||

The specific features may be defined with a corresponding decimal value in the List of Features IE (i.e., in octets 6 to (6+n)). For instance, the lawful interception feature may be associated with the feature value 0, and the usage reporting feature may be associated with the feature value 1.

Spare bits in a header defined in the 3GPP specification section 7.2.2.3 (PFCP Header for Session Related Messages) may be used to indicate whether some IEs are encrypted (e.g., for IE level encryption) or the entire payload is encrypted (e.g., for message level or feature level encryption), as shown in Table 7, such that octet 16/bit 3 can be used to identify IE level encryption and octet 16/bit 4 can be used to identify feature level encryption.

TABLE 7

Extended PFCP header for session related messages

| Octets | Bits | | | | | | | |
|---|---|---|---|---|---|---|---|---|
| | 8 | 7 | 6 | 5 | 4 | 3 | 2 | 1 |
| 1 | Version | | | Spare | | FO | MP | S = 1 |
| 2 | Message Type | | | | | | | |
| 3 to 4 | Message Length | | | | | | | |
| 5 to 12 | Session Endpoint Identifier | | | | | | | |
| 13 to 15 | Sequence Number | | | | | | | |
| 16 | Message Priority | | | Message Encrypt | | IE encrypt | Spare | |

It is to be understood that the spare bits and indications as illustrated in Table 7 are provided for illustrative purposes only and are not meant to limit the broad scope of the present disclosure. For example, in one instance octet 16/bit 3 could be used to indicate message level encryption and octet 12/bit 4 could be used to indicate feature level encryption. In still another instance, any other combination of spare bits (e.g., octet 1/bit 4, octet 1/bit 5, octet 16/bit 1, or octet 16/bit 2) could be used to indicate encryption information.

In another example, the association request 210 and the association response 215 may be an Echo Request/Response exchange in a General Packet Radio Service (GPRS) Tunneling Protocol (GTP) connection between an SGW node and a PGW node. Alternatively, the Echo Request/Response exchange may be between an SGW node and an MME node. The first node 110 (e.g., the SGW node) may apply a hashing algorithm on a Tunnel Endpoint Identifier (TEID) present in a Control Plane GTP message (GTP-C or GTPC) header. If the TED of the GTP-C header is zero, then the first node 110 may apply the hashing algorithm to a sequence number in the GTP-C header. The first node 110 may set a flag in the GTP-C header of the message 230, such as a GTP-C Create Session Request, in this example, to indicate that the payload of the message 230 is encrypted.

The 3GPP specification 29.274 defines path management messages for GTP-C: Echo Request, Echo Response messages. In one example, the Node Features IE in Echo Request and Echo Response messages may be used to indicate support for message level encryption, IE level encryption, a list of encrypted IEs, feature level encryption, and/or a list of specific features to be encrypted. The Node Feature IE may be extended as shown in Table 8, such that octet 6 can be used to identify IE level encryption (bit 1), User Plane GTP (GTP-U or GTPU) message level encryption (bit 2), GTPC message level encryption (bit 3), or feature level encryption (bit 4). Additionally, octets m to m+n can be used to identify a list of encrypted IEs (if IE level encryption is enabled) and octets o to o+n can be used to identify a list of feature(s) that are to be encrypted (if feature level encryption is enabled).

TABLE 8

Extended Node Features IE

| Octets | Bits | | | | | | | |
|---|---|---|---|---|---|---|---|---|
| | 8 | 7 | 6 | 5 | 4 | 3 | 2 | 1 |
| 1 | Type = 152 (decimal) | | | | | | | |
| 2 to 3 | Length = n | | | | | | | |
| 4 | Spare | | | | Instance | | | |
| 5 | Supported Features | | | | | | | |

TABLE 8-continued

Extended Node Features IE

| Octets | Bits | | | | | | | |
|---|---|---|---|---|---|---|---|---|
| | 8 | 7 | 6 | 5 | 4 | 3 | 2 | 1 |
| 6 | Spare | | | | Feature En-crypt | GTPC Message Ecnrypt | GTPU Message Encrypt | IE En-crypt |
| m to m + n | List of encrypted IEs | | | | | | | |
| o to o + n | List of features to encrypt | | | | | | | |
| p to (p + 4) | These octet(s) is/are present only if explicitly specified | | | | | | | |

It is to be understood that the spare bits and indications as illustrated in Table 8 are provided for illustrative purposes only and are not meant to limit the broad scope of the present disclosure. For example, octet 6/bit 1 may be used to identify GTPU messages level encryption, GTPC message level encryption, or feature level encryption. Similarly, octet 6/bit 2 may be used to identify IE level encryption, GTPC message level encryption, or feature level encryption; octet 6/bit 3 may be used to identify IE level encryption, GTPU message level encryption, or feature level encryption; and octet 6/bit 4 may be used to identify IE level encryption, GTPU level encryption, or GTPC level encryption. In other instances, any other combination of spare bits (e.g., octet 4/bits 5-8 or octet 6/5-8) could be used to indicate encryption information.

To support the extension of the 3GPP specification to include encryption level notification in GTP protocols, additional IEs may be defined to further specify the level of encryption. For instance, when IE level encryption has been specified, an new IE may list the IEs to be encrypted, as shown in Table 9.

TABLE 9

New IE - List of Encrypted IEs

| Octets | Bits | | | | | | | |
|---|---|---|---|---|---|---|---|---|
| | 8 | 7 | 6 | 5 | 4 | 3 | 2 | 1 |
| 1 to 2 | Type = X (decimal) | | | | | | | |
| 3 to 4 | Length = n | | | | | | | |
| 5 | Number of encrypted IEs (k) | | | | | | | |
| 6 to (6 + n) | List of k GTPC IE Type values | | | | | | | |
| m to (m + 4) | These octet(s) is/are present only if explicitly specified | | | | | | | |

Similarly, to support feature level encryption in GTP protocols, a new IE may list specific features that will cause messages associated with the specific features to be encrypted, as shown in Table 10.

TABLE 10

New IE - List of Encrypted features

| Octets | Bits | | | | | | | |
|---|---|---|---|---|---|---|---|---|
| | 8 | 7 | 6 | 5 | 4 | 3 | 2 | 1 |
| 1 to 2 | Type = X (decimal) | | | | | | | |
| 3 to 4 | Length = n | | | | | | | |
| 5 | Spare | | | | Number of features | | | |
| 6 to (6 + n) | List of features | | | | | | | |
| m to (m + 4) | These octet(s) is/are present only if explicitly specified | | | | | | | |

The specific features may be defined with a corresponding decimal value in the List of Features IE (i.e., in octets 6 to (6+n)). For instance, the lawful interception feature may be associated with the feature value 0, and the load overload reporting feature may be associated with the feature value 1.

Spare bits in a header defined in the 3GPP specification 29.274, section 5.4 (4G/5G specific GTP-C header), such as octet 12, bits 1 and 2, may be used to indicate whether some IEs are encrypted (e.g., for IE level encryption) or the entire payload is encrypted (e.g., for message level (octet 12/bit 2) or feature level encryption (octet 12/bit1), as shown in Table 11.

TABLE 11

Extended GTPv2 Control Plane message header

| Octets | Bits | | | | | | |
|---|---|---|---|---|---|---|---|
| | 8 | 7 | 6 | 5 | 4 | 3 | 2 | 1 |
| 1 | Version | | P | T = 1 | MP | Spare | Spare |
| 2 | Message Type | | | | | | |
| 3 to 4 | Message Length | | | | | | |
| 5 to 8 | Tunnel Endpoint Identifier | | | | | | |
| 9 to 11 | Sequence Number | | | | | | |
| 12 | Message Priority | | | | | Message encrypt | IE encrypt |

It is to be understood that the spare bits and indications as illustrated in Table 11 are provided for illustrative purposes only and are not meant to limit the broad scope of the present disclosure. For example, in one instance octet 12/bit 1 could be used to indicate message level encryption and octet 12/bit 2 could be used to indicate feature level encryption. In still another instance, any other combination of spare bits (e.g., octet 1/bit 1, octet 1/bit2, or octet 12/bit 4) could be used to indicate encryption information.

Spare bits in a header defined in the 3GPP specification 29.281 section 5 (GTP-U header), such as octet 1, bit 4, may be used to indicate whether the payload is encrypted (e.g., for message level or feature level encryption), as shown in Table 12.

TABLE 12

Extended GTP-U header

| Octets | Bits | | | | | | |
|---|---|---|---|---|---|---|---|
| | 8 | 7 | 6 | 5 | 4 | 3 | 2 | 1 |
| 1 | Version | | PT | | Message Encrypt | E | S | PN |
| 2 | Message Type | | | | | | |
| 3 to 4 | Message Length | | | | | | |
| 5 to 8 | Tunnel Endpoint Identifier | | | | | | |
| 9 to 10 | Sequence Number | | | | | | |
| 11 | N-PDU Number | | | | | | |
| 12 | Next Extension Header Type | | | | | | |

Figure 3A:
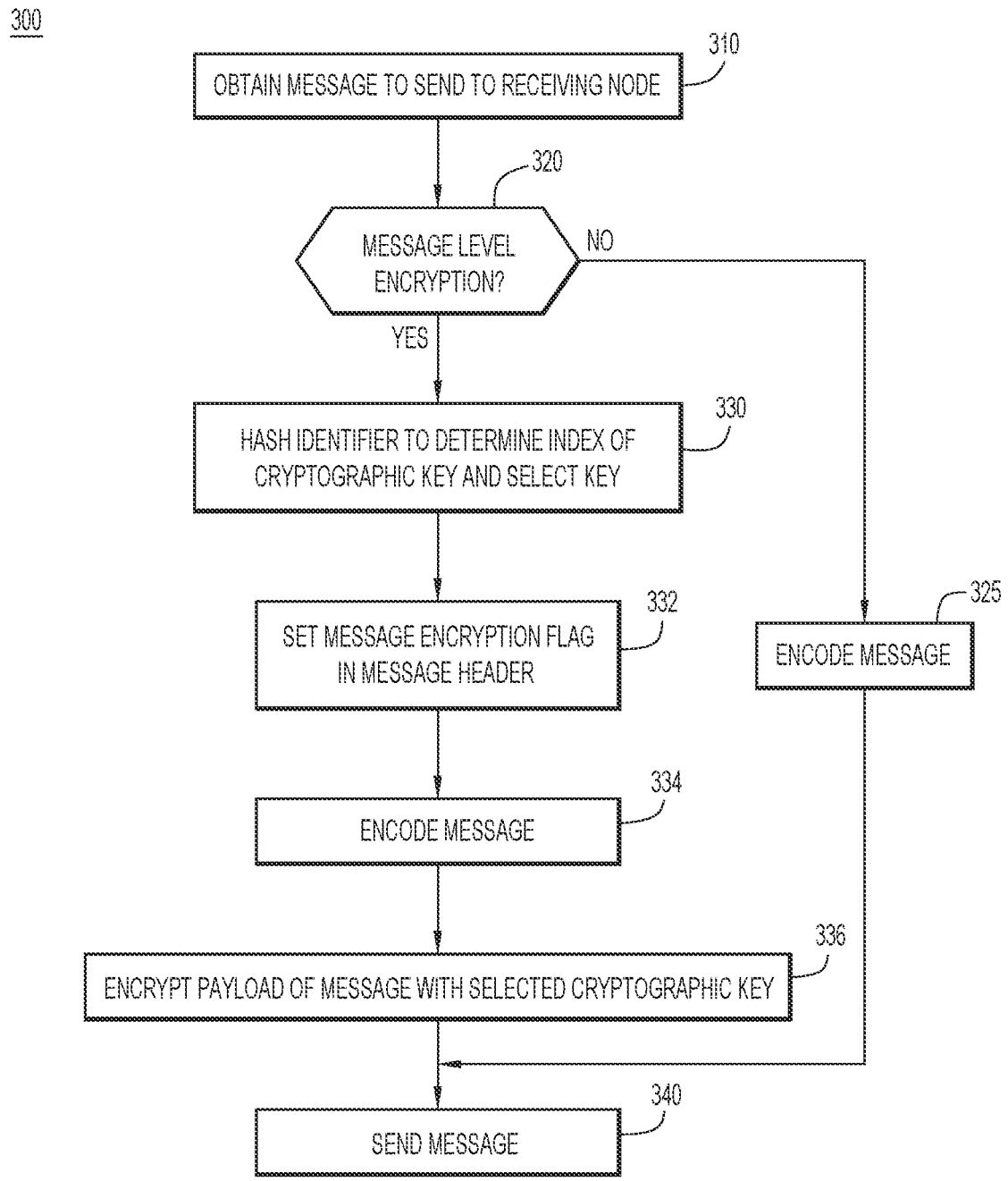
FIG. 3A is a flowchart illustrating operations performed at a sending node in a network system to perform message level encryption, according to an example embodiment.

Referring now to FIG. 3A, a flowchart illustrates operations performed by a sending network node (e.g., first node 110) in a process 300 to selectively encrypt the payload of messages sent to a receiving network node. At 310, the sending node obtains a message to send to the receiving node. In one example, the message may be a control message from a sending control plane node (e.g., an SMF node) to a receiving user plane node (e.g., a UPF node). The sending node determines whether to encrypt the payload of the message at 320. In one example, the sending node may determine whether a message level encryption has been negotiated between the sending node and the receiving node. If the message does not need to be encrypted, then the sending node encodes the message according to the appropriate protocol (e.g., PFCP or GTP) at 325 without any encryption.

If the sending node determines that message level encryption has been negotiated with the receiving node, then the sending node hashes an identifier at 330 in order to select a cryptographic key for the encryption. The sending node may determine the identifier from the association between the sending node and the receiving node. In one example, the identifier may be included in the header of messages sent between the network nodes (e.g., an SEID, a TEID, or a sequence number). The sending node uses the hash of the identifier as an index to select a cryptographic key from a predetermined set of keys that are provisioned on the sending node. In one example, the set of keys may be a set of public/private key pairs that are provisioned on both the sending node and the receiving node.

At 332, the sending node sets a message encryption flag in the header of the message to signal the receiving node that the payload of the message is encrypted. In one example, the message flag indicates the level of encryption (i.e., message level encryption) for the message. At 334, the sending node encodes the message according to the appropriate protocol for the connection between the sending node and the receiving node. In one example, the message may be encoded according to a PFCP protocol or a GTP protocol. At 336, the sending node encrypts the payload of the message with the selected cryptographic key. In one example, the sending node may encrypt the payload with the public key of a public/private key pair corresponding to the hash of an identifier in the header of the encoded message.

At 340, the sending node sends the message to the receiving node. The message may include the encrypted payload if the message level encryption has been negotiated between the sending node and the receiving node. Alternatively, the message may include an unencrypted payload if the message level encryption has not been selected for the message at 320.

Figure 3B:
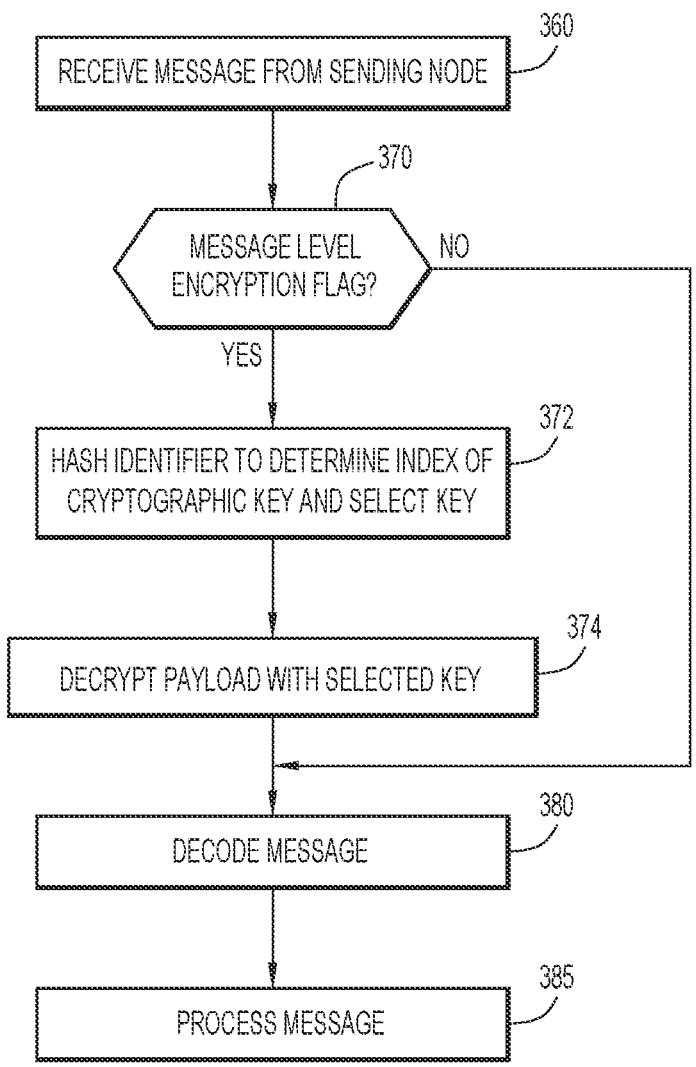
FIG. 3B is a flowchart illustrating operations performed at a receiving node in a network system to perform message level encryption, according to an example embodiment.

Referring now to FIG. 3B, a flowchart illustrates operations performed by a receiving network node (e.g., second node 120) in a process 350 to detect message level encryption in a message received from a sending node. At 360, the receiving node receives a message from a sending node. In one example, the message may a PFCP message or a GTP message (e.g., an Echo Request). At 370, the receiving node determines whether the message includes a message level encryption flag. In one example, the message may include a header that indicates the payload of the message is encrypted through message level encryption.

If the receiving node determines that the message does include a message level encryption flag, then the receiving node hashes an identifier associated with the message at 372 to determine an index to select a cryptographic key. In one example, the identifier may be included in the header of the message received from the sending node (e.g., an SEID, a TEID, or a sequence number). In another example, the receiving node may select the cryptographic key from a predetermined set of keys provisioned on the receiving node.

At 374, the receiving node decrypts the payload of the received message with the selected key. In one example, the receiving node may select a public/private key pair from the hash of the identifier at 372, and use the private key of the key pair to decrypt the payload that was encrypted with the public key at the sending node.

Once the unencrypted payload is available at the receiving node, the receiving node decodes the message at 380 and processes the message at 385. In one example, the receiving node may respond to the message (e.g., with an acknowledgement message) by following some or all of the steps described in FIG. 3A. For instance, in preparing the response message, the receiving node may set the message encryption flag and encrypt the payload with a cryptographic key based on the hash of the identifier determined at 372 rather than recompute the hash of the same identifier as the sending node does at 330. In one example, the receiving node may use the public key of the public/private key pair selected at 372 to encrypt the payload of the response message.

Figure 4:
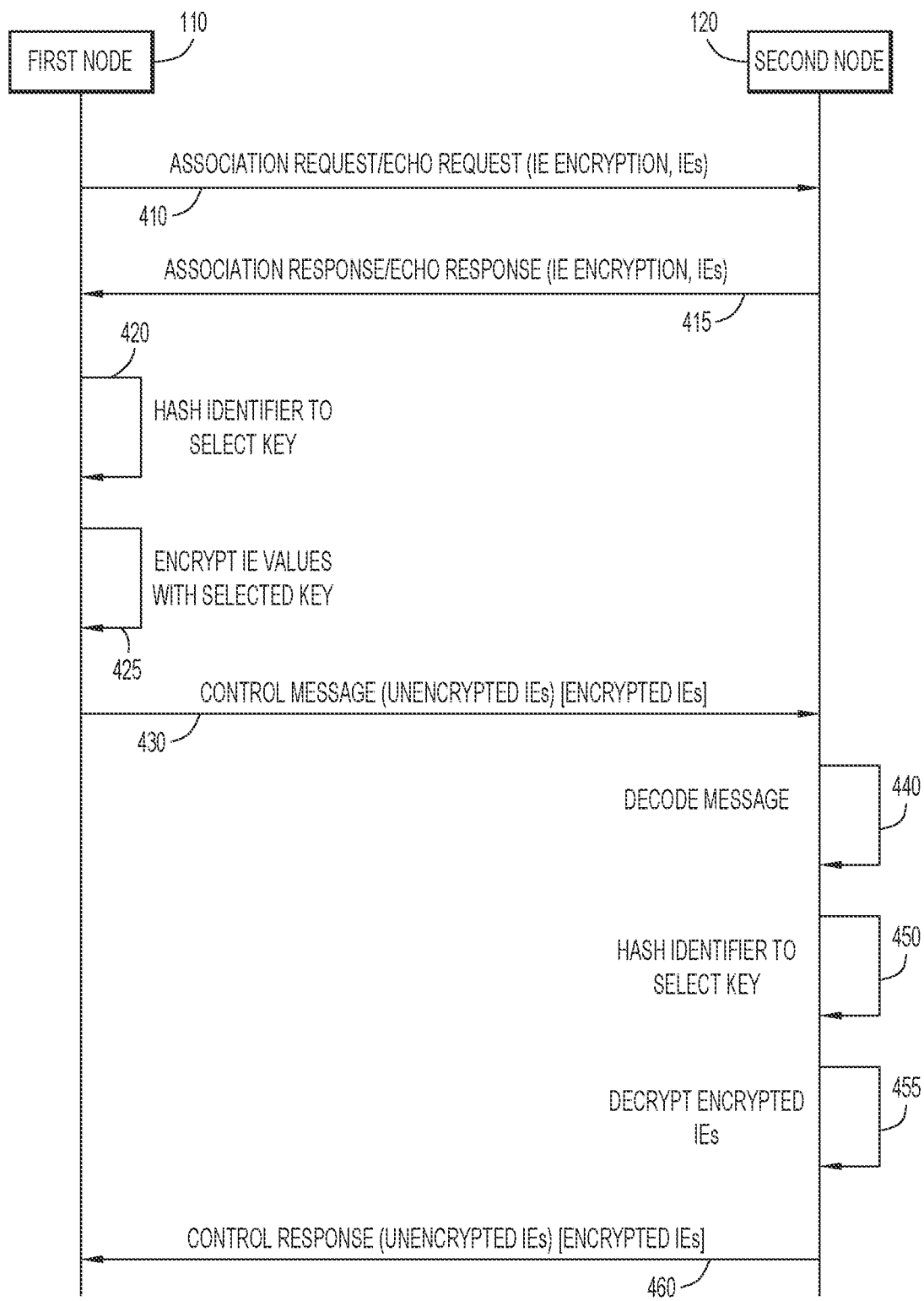
FIG. 4 is a message flow diagram illustrating messages within a network system to negotiate and send messages encrypted at an Information Element (IE) level, according to an example embodiment.

Referring now to FIG. 4, a message flow diagram illustrates messages between a first node 110 and a second node 120 that negotiate an IE level encryption and encrypt the messages between the two nodes. The first node 110 sends an association request 410 to the second node 120. In one example, the association request 410 may be a PFCP Association Setup Request or a PFCP Association Update Request. Alternatively, the association request 410 may be an GTP Echo Request. The association request 410 includes an indication of the capabilities of the first node 110, including that the first node 110 supports IE level encryption. In one example, the association request may list specific IEs to encrypt in messages between the first node 110 and the second node 120. In another example, the association request 410 may indicate additional capabilities of the first node 110. For instance, the association request 410 may indicate that the first node 110 is capable of supporting message level encryption, IE level encryption for a specified set of IEs, and feature level encryption for a specified set of features.

The second node 120 responds to the association request 410 with an association response 415. In one example, the association response 415 may be a PFCP Association Setup Response or a PFCP Association Update Response. Alternatively, the association response 415 may be an GTP Echo Response. The association response 415 confirms the level of encryption supported by both the second node 120 and the first node 110. For instance, the association response 415 may indicate that specific IEs in the payload of messages between the first node 110 and the second node 120 will be encrypted, i.e., IE level encryption.

After the first node 110 and the second node 120 have negotiated an association with a message level of encryption, the first node 110 selects a cryptographic key at 420. In one example, the first node 110 may select a cryptographic key from a set of keys based on identifier of the association between the first node 110 and the second node 120. For instance, the first node 110 may hash a session endpoint identifier or a tunnel endpoint identifier to select a cryptographic key.

The first node 110 encrypts the selected IEs in the payload of a message at 425 and sends the message 430 with the encrypted IEs to the second node 120. In one example, the selected cryptographic key is a public/private key pair, and the encrypted IEs of the message 430 are encrypted with the public key of the key pair. In another example, the message 430 may be a PFCP Session Establishment Request. Alternatively, the message 430 may be a GTP-C Create Session Request.

When the second node 120 receives the message 430 with the encrypted IEs, the second node 120 decodes the message 430 at 440. In one example, any unencrypted IEs may be processed after decoding the message 430. To decrypt the encrypted IEs in the payload, the second node 120 hashes an identifier encoded in the message 430 to select the corresponding cryptographic key at 450. In one example, the identifier is the same identifier (e.g., session endpoint identifier or tunnel endpoint identifier) that the first node 110 hashed at 420 to select the cryptographic key. The second node 120 may select a corresponding private key associated with the public key that was used by the first node 110 to encrypt the IEs in the payload of the message 430. The second node 120 decrypts the encrypted IEs of the message 230 at 455 using the selected cryptographic key.

If the second node 120 has a response to the message 430, then the second node 120 will encrypt the same set of IEs in the payload of the response 460 using the selected cryptographic key or key pair. The second node 120 sends the response 460 with the encrypted IEs to the first node 110. In one example, the second node 120 uses the private key of a key pair to decrypt the encrypted IEs in the payload of the message 430 and uses the public key of the key pair to encrypt the IEs in the payload of the response 460. In another example, the response 460 may be a PFCP Session Establishment Response. Alternatively, the response 460 may be a GTPC Create Session Response.

In one example, the association request 410 and association response 415 may be a Packet Forwarding Control Protocol (PFCP) Association Setup or Update exchange between a control plane node (e.g., first node 110) to a user plane node (e.g., second node 120). In the example of FIG. 4, the first node 110 initiates the association setup or update exchange, but the association may also be initiated from the second node 120. In other words, either the control plane node or the user plane node may initiate the association setup or update exchange.

The first node 110 may apply a hashing algorithm an a Session Endpoint Identifier (SEID) present in the PFCP header to select the cryptographic key. If the SEID of the PFCP header is zero, then the first node 110 may apply the hashing algorithm to a sequence number in the PFCP header. The first node 110 may set a flag in the PFCP header of the message 430 to indicate that IEs in the payload of the message 430 is encrypted. Additionally, the first node 110 may include a list of encrypted IEs (e.g., User ID, Trace Information, Access Point Name (APN)/Data Network Name (DNN), and/or Duplicating Parameters IEs), in the PFCP header of the message 430.

In another example, the association request 410 and the association response 415 may be an Echo Request/Response exchange in a General Packet Radio Service (GPRS) Tunneling Protocol (GTP) connection between an SGW node and a PGW node. The first node 110 (e.g., the SGW node) may apply a hashing algorithm on a Tunnel Endpoint Identifier (TEID) present in the GTP header. If the TEID of the GTP header is zero, then the first node 110 may apply the hashing algorithm to a sequence number in the GTP header. The first node 110 may set a flag in the GTP header of the message 430, such as a Create Session Request, in this example, to indicate that IEs in the payload of the message 430 are encrypted (e.g., International Mobile Subscriber Identity (IMSI), Mobile Station International Subscriber Director Number (MSISDN), International Mobile Equipment Identity (IMEI), Access Point Name (APN), and/or User Location Information (ULI)). The first node 110 may also include an indication of which IEs are encrypted in payload of the message 430.

Figure 5A:
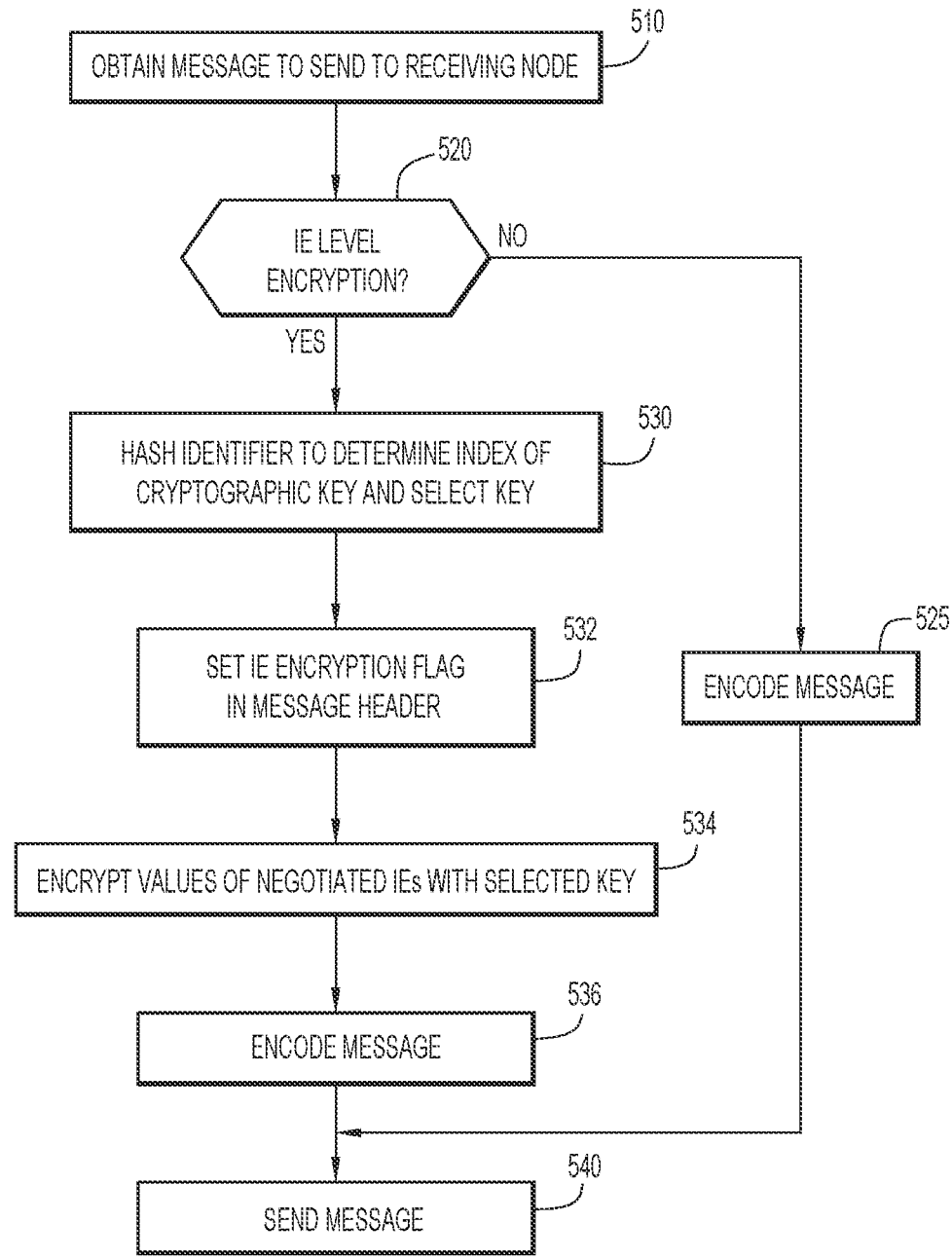
FIG. 5A is a flowchart illustrating operations performed at a sending node in a network system to perform IE level encryption, according to an example embodiment.

Referring now to FIG. 5A, a flowchart illustrates operations performed by a sending network node (e.g., first node 110) in a process 500 to selectively encrypt IEs in the payload of messages sent to a receiving network node. At

510, the sending node obtains a message to send to the receiving node. In one example, the message may be a control message from a sending control plane node (e.g., an SMF node) to a receiving user plane node (e.g., a UPF node). The sending node determines whether to encrypt IEs in the payload of the message at 520. In one example, the sending node may determine whether IE level encryption has been negotiated between the sending node and the receiving node. If the message does not need to be encrypted, then the sending node encodes the message according to the appropriate protocol (e.g., PFCP) at 525 without any encryption.

If the sending node determines that IE level encryption has been negotiated with the receiving node, then the sending node hashes an identifier at 530 in order to select a cryptographic key for the encryption. The sending node may determine the identifier from the association between the sending node and the receiving node. In one example, the identifier may be included in the header of messages sent between the network nodes (e.g., an SEID, a TEID, or a sequence number). The sending node uses the hash of the identifier as an index to select a cryptographic key from a predetermined set of keys that are provisioned on the sending node. In one example, the set of keys may be a set of public/private key pairs that are provisioned on both the sending node and the receiving node.

At 532, the sending node sets an IE encryption flag in the header of the message to signal the receiving node that IEs in the payload of the message are encrypted. In one example, the message flag indicates the level of encryption (i.e., IE level encryption) for the message. At 534, the sending node encrypts the negotiated IEs with the selected cryptographic key. In one example, the sending node may encrypt the IEs with the public key of a public/private key pair corresponding to the hash of an identifier in the header of the encoded message. At 536, the sending node encodes the message according to the appropriate protocol for the connection between the sending node and the receiving node. In one example, the message may be encoded according to a PFCP protocol or a GTP protocol.

At 540, the sending node sends the message to the receiving node. The message may include the encrypted IEs in the payload if the IE level encryption has been negotiated between the sending node and the receiving node. Additionally, the message may include one or more unencrypted IEs. Including unencrypted IEs enables the network provider to run some analytics without compromising sensitive information from the encrypted IEs.

Figure 5B:
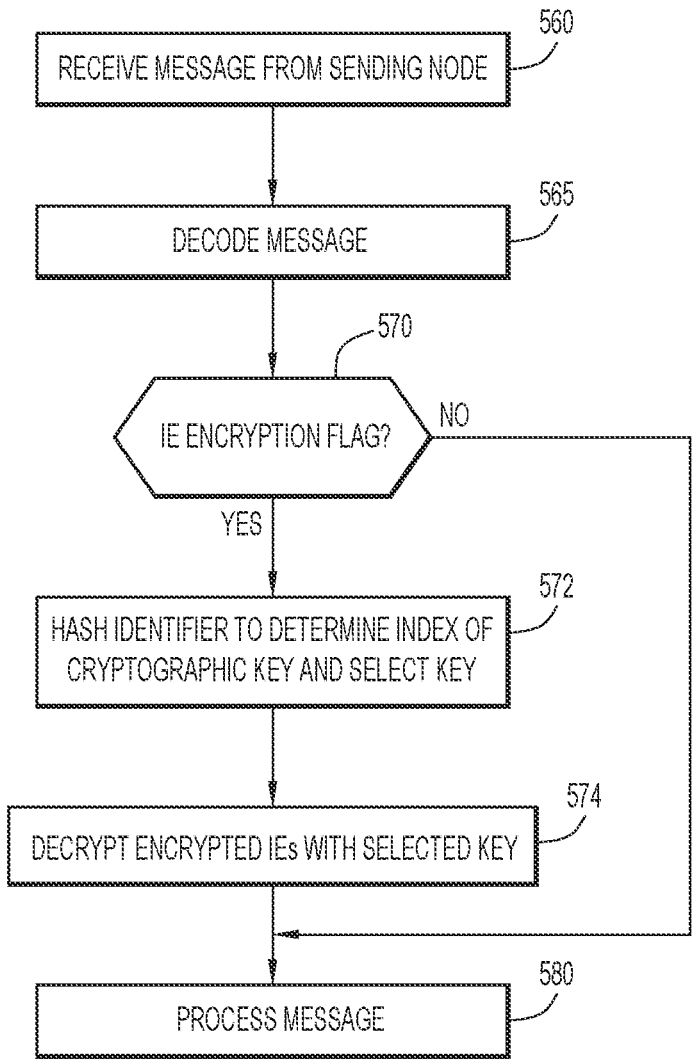
FIG. 5B is a flowchart illustrating operations performed at a receiving node in a network system to perform IE level encryption, according to an example embodiment.

Referring now to FIG. 5B, a flowchart illustrates operations performed by a receiving network node (e.g., second node 120) in a process 550 to detect IE level encryption in a message received from a sending node. At 560, the receiving node receives a message from a sending node. In one example, the message may a PFCP message or a GTP message (e.g., an Echo Request). At 565, the receiving node decodes the message received from the sending node. In one example, the receiving node may decode the header of the message and separate out any IEs in the payload of the message.

At 570, the receiving node determines whether the message includes an IE level encryption flag. In one example, the message may include a header that indicates the payload of the message is encrypted with IE level encryption. If the receiving node determines that the message does include an IE level encryption flag, then the receiving node hashes an identifier associated with the message at 572 to determine an index to select a cryptographic key. In one example, the identifier may be included in the header of the message received from the sending node (e.g., an SEID, a TEID, or a sequence number). In another example, the receiving node may select the cryptographic key from a predetermined set of keys provisioned on the receiving node.

At 574, the receiving node decrypts the encrypted IEs in the payload of the received message with the selected key. In one example, the receiving node may select a public/private key pair from the hash of the identifier at 572, and use the private key of the key pair to decrypt the payload that was encrypted with the public key at the sending node.

Once the unencrypted IEs are available at the receiving node, the receiving node processes the message at 580. In one example, the receiving node may respond to the message (e.g., with an acknowledgement message) by following some or all of the steps described in FIG. 5A. For instance, in preparing the response message, the receiving node may set the IE level encryption flag and encrypt the payload with a cryptographic key based on the hash of the identifier determined at 572 rather than recompute the hash of the same identifier as the sending node does at 530. In one example, the receiving node may use the public key of the public/private key pair selected at 572 to encrypt the payload of the response message.

Figure 6:
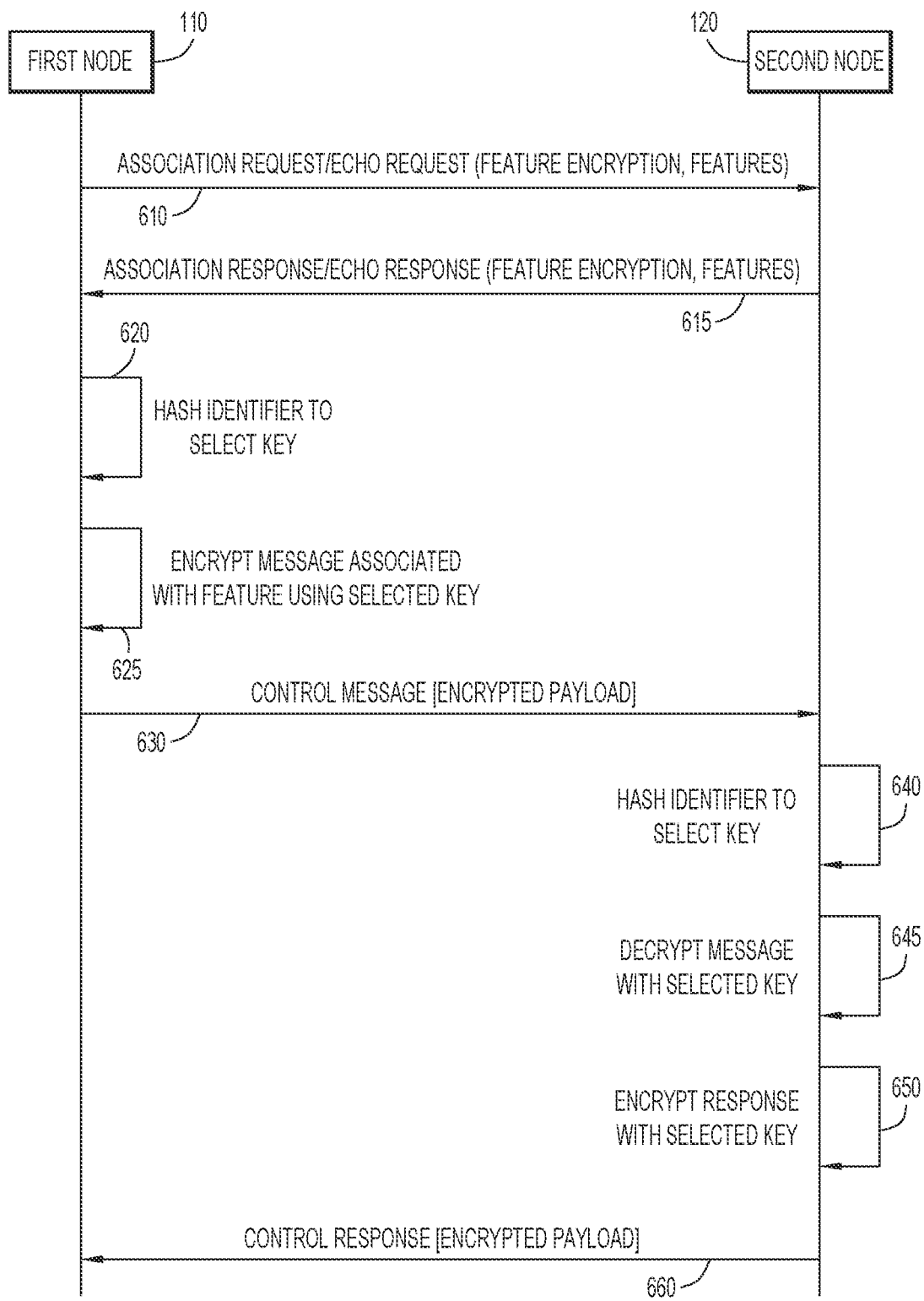
FIG. 6 is a message flow diagram illustrating messages within a network system to negotiate and send messages encrypted at a feature level, according to an example embodiment.

Referring now to FIG. 6, a message flow diagram illustrates messages between a first node 110 and a second node 120 that negotiate a feature level encryption and encrypt the subset of messages that are associated with specific features. The first node 110 sends an association request 610 to the second node 120. In one example, the association request 210 may be a PFCP Association Setup Request or a PFCP Association Update Request. Alternatively, the association request 610 may be an GTP Echo Request. The association request 610 includes an indication of the capabilities of the first node 110, including that the first node 110 supports feature level encryption. In one example, the association request may list specific features supported in feature level encryption by the first node 110. In another example, the association request 610 may indicate additional capabilities of the first node 110. For instance, the association request 610 may indicate that the first node 110 is capable of supporting message level encryption, IE level encryption for a specified set of IEs, and feature level encryption for a specified set of features.

The second node 120 responds to the association request 610 with an association response 615. In one example, the association response 615 may be a PFCP Association Setup Response or a PFCP Association Update Response. Alternatively, the association response 615 may be an GTP Echo Response. The association response 615 confirms the level of encryption supported by both the second node 120 and the first node 110. For instance, the association response 615 may indicate that message payloads associated with specific features (e.g., Usage Reporting or Overload Control) will be encrypted between the first node 110 and the second node 120, i.e., feature level encryption.

After the first node 110 and the second node 120 have negotiated an association with a message level of encryption, the first node 110 selects a cryptographic key at 620. In one example, the first node 110 may select a cryptographic key from a set of keys based on identifier of the association between the first node 110 and the second node 120. For instance, the first node 110 may hash a session endpoint identifier or a tunnel endpoint identifier to select a cryptographic key.

The first node 110 determines that a message 630 is in the subset of messages associated with a specific feature (e.g., Usage Reporting or Overload Control Information) and encrypts the payload at 625 and sends the message 630 with the encrypted payload to the second node 120. In one example, the message 630 may be a PFCP Session Report Request that is associated with a Usage Reporting feature. Alternatively, the message 630 may be a GTPC Create Session Request containing Overload Control information from the first node 110 (i.e., the SGW).

In one example, the selected cryptographic key is a public/private key pair, and the encrypted IEs of the message 630 are encrypted with the public key of the key pair. In another example, the first node 110 may send messages that are not associated with the specific feature with an unencrypted payload, e.g., to conserve computing resources. Additionally, sending some messages with unencrypted payloads allows the network to perform some analytics on the traffic without compromising sensitive information associated with the specific feature designated for feature level encryption.

When the second node 120 receives the message 630 with the encrypted payload, the second node 120 hashes an identifier encoded in the message 630 to select the corresponding cryptographic key at 640. In one example, the identifier is the same identifier (e.g., session endpoint identifier or tunnel endpoint identifier) that the first node 110 hashed at 620 to select the cryptographic key. The second node 120 may select a corresponding private key associated with the public key that was used by the first node 110 to encrypt the payload of the message 230. The second node 120 decrypts the payload of the message 630 at 645 using the selected cryptographic key.

If the second node 120 has a response to the message 630, then the second node 120 will encrypt the payload of the response at 650 using the selected cryptographic key or key pair. In one example, the second node 120 encrypts the payload of the response 660 because the response 660 is associated with the same specific feature indicated in the association response 615 that caused the first node 110 to encrypt the message 630. The second node 120 sends the response 660 with the encrypted payload to the first node 110. In one example, the second node 120 uses the private key of a key pair to decrypt the encrypted IEs in the payload of the message 430 and uses the public key of the key pair to encrypt the IEs in the payload of the response 460. In another example, the response 660 may be a PFCP Session Report Response associated with the Usage Reporting feature. Alternatively, the response 660 may be a GTPC Create Session Response containing APN level Load Control information from the second node 120 (i.e., the PGW).

In one example, the association request 610 and association response 615 may be a Packet Forwarding Control Protocol (PFCP) association setup or update exchange between a control plane node (e.g., first node 110) to a user plane node (e.g., second node 120). In the example of FIG. 6, the first node 110 initiates the association setup or update exchange, but the association may also be initiated from the second node 120. In other words, either the control plane node or the user plane node may initiate the association setup or update exchange.

The first node 110 may apply a hashing algorithm an a Session Endpoint Identifier (SEID) present in the PFCP header to select the cryptographic key. If the SEID of the PFCP header is zero, then the first node 110 may apply the hashing algorithm to a sequence number in the PFCP header. The first node 110 may set a flag in the PFCP header of the message 630 to indicate that the payload of the message 630 is encrypted.

In another example, the association request 610 and the association response 615 may be an Echo Request/Response exchange in a General Packet Radio Service (GPRS) Tunneling Protocol (GTP) connection between an SGW node and a PGW node. The first node 110 (e.g., the SGW node) may apply a hashing algorithm on a Tunnel Endpoint Identifier (TEID) present in the GTP-C header. If the TEID of the GTP-C header is zero, then the first node 110 may apply the hashing algorithm to a sequence number in the GTP-C header. The first node 110 may set a flag in the GTP-C header of the message 630, such as a GTP-C Create Session Request, in this example, to indicate that the payload of the message 630 is encrypted.

In a further example, the association request 610 and the association response 615 may be used to negotiate feature level encryption between two GTP-U nodes. In other words both the first node 110 and the second node 120 may be user plane nodes. In one example of an exchange negotiating feature level encryption between GTP-U nodes, particular Universal Resource Locators (URLs) may be configured in the first node 110 and the second node 120. Traffic flowing between the first node 110 and the second node 120 for these particular URLs may be encrypted based on the feature level encryption.

Figure 7:
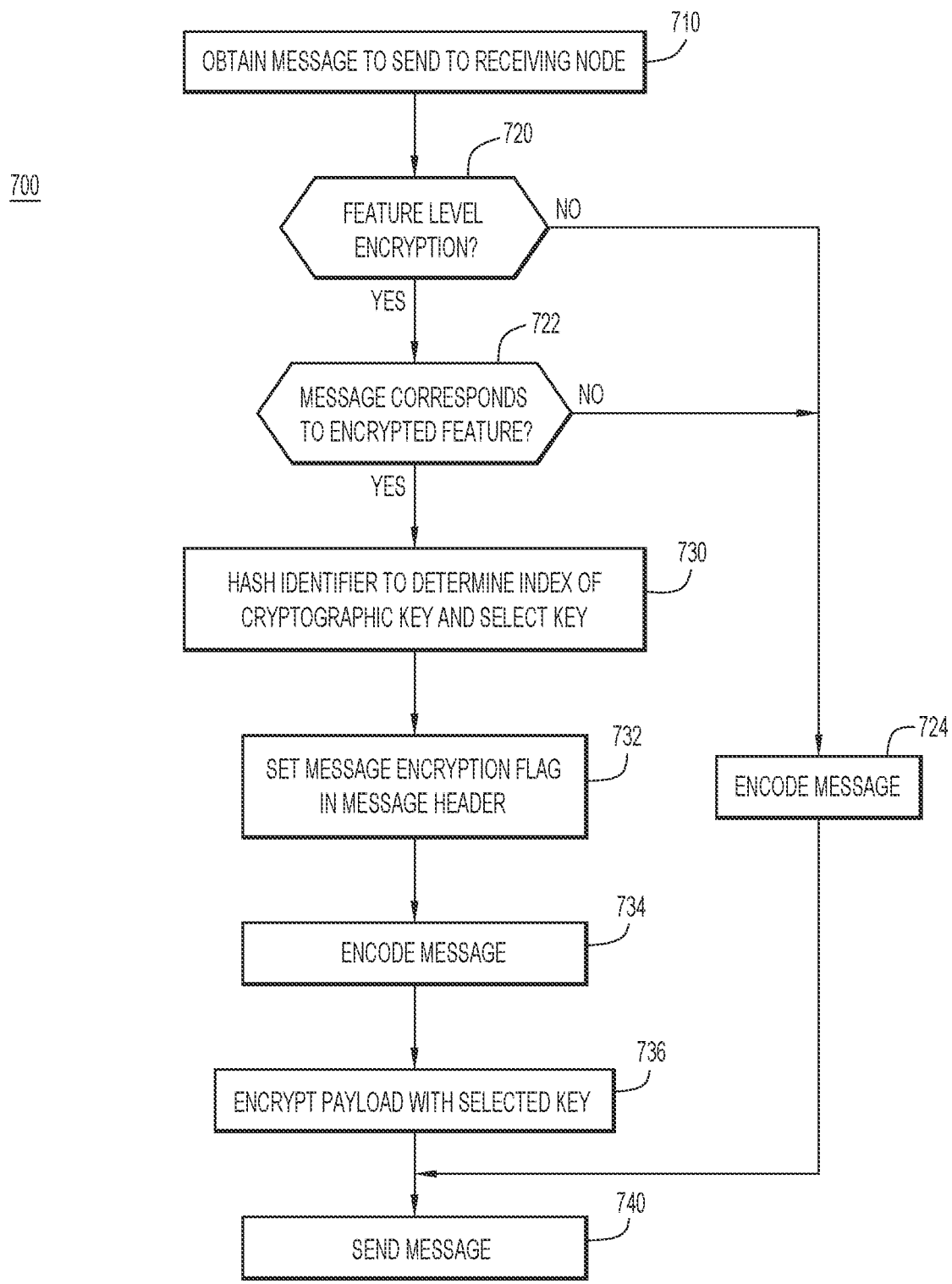
FIG. 7 is a flowchart illustrating operations performed at a sending node in a network system to perform feature level encryption, according to an example embodiment.

Referring now to FIG. 7 a flowchart illustrates operations performed by a sending network node (e.g., first node 110) in a process 700 to selectively encrypt the payload of messages associated with a specific feature that are sent to a receiving network node. At 710, the sending node obtains a message to send to the receiving node. In one example, the message may be a control message from a sending control plane node (e.g., an SMF node) to a receiving user plane node (e.g., a UPF node).

The sending node determines whether feature level encryption is enabled at 720. In one example, the sending node may determine whether feature level encryption has been negotiated between the sending node and the receiving node. If feature level encryption has been enabled, the sending node determines at 722 whether the message corresponds to a specific feature that has been negotiated to be encrypted. If the message does not need to be encrypted, (e.g., because feature level encryption has not been enabled, or because the message is not associated with an encrypted feature) then the sending node encodes the message according to the appropriate protocol (e.g., PFCP) at 724 without any encryption.

If the sending node determines that feature level encryption has been negotiated with the receiving node, and that the message is associated with an encrypted feature, then the sending node hashes an identifier at 730 in order to select a cryptographic key for the encryption. The sending node may determine the identifier from the association between the sending node and the receiving node. In one example, the identifier may be included in the header of messages sent between the network nodes (e.g., an SEID, a TEID, or a sequence number). The sending node uses the hash of the identifier as an index to select a cryptographic key from a predetermined set of keys that are provisioned on the sending node. In one example, the set of keys may be a set of public/private key pairs that are provisioned on both the sending node and the receiving node.

At 732, the sending node sets a message encryption flag in the header of the message to signal the receiving node that payload of the message is encrypted. In one example, the message flag indicates the level of encryption (i.e., feature level encryption) for the message. At 734, the sending node encodes the message according to the appropriate protocol for the connection between the sending node and the receiving node. In one example, the message may be encoded according to a PFCP protocol or a GTP protocol. At 736, the sending node encrypts the payload with the selected cryptographic key. In one example, the sending node may encrypt the payload with the public key of a public/private key pair corresponding to the hash of an identifier in the header of the encoded message.

At 740, the sending node sends the message to the receiving node. The message may include the encrypted payload if the feature level encryption has been negotiated between the sending node and the receiving node and the message is associated with an encrypted feature.

The receiving node may detect the message payload encryption in feature level encryption associations in the same way as described in FIG. 3B with respect to message level encryption. The receiving node does not require an indication that the payload is encrypted because of the feature level to decrypt and decode the message. The sending node only encrypts the messages associated with the encrypted feature and may only signal that the payload is encrypted without signaling why the payload is encrypted, i.e., because of the feature level encryption.

Figure 8:
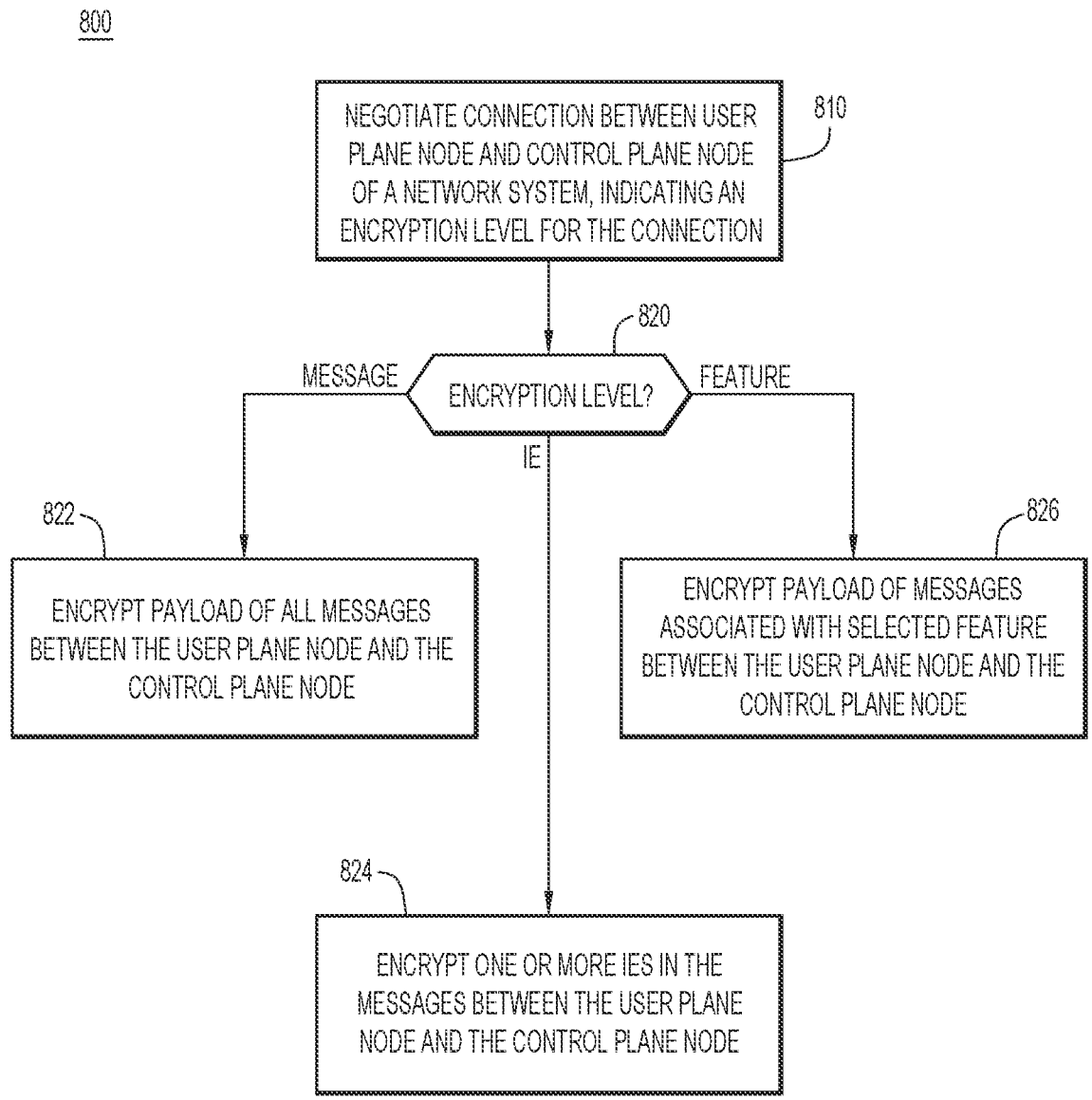
FIG. 8 is a flowchart illustrating operations performed at a network node to negotiate an encryption level for communication with another network node, according to an example embodiment.

Referring now to FIG. 8 a flowchart illustrates operations performed by a network node (e.g., a user plane node or a control plane node) in a process 800 to negotiate and selectively encrypt messages between the network node and another network node. At 810, the network node negotiates a connection between a user plan node and a control plane node of a network system. In one example, the network mode may be the user plane node or the control plane node. In another example, the connection may be based on a PFCP protocol or a GTP protocol. The network node indicates an encryption level for the connection as part of negotiating the connection. The encryption level may be message level encryption, IE level encryption, or feature level encryption. In one example, the indication of the encryption level may be included in the negotiation of the connection. Additionally, each network node may indicate the encryption level in the messages passed between the user plane node and the control plane node. For instance, each node may include a flag in a header of messages between the user plane node and the control plane node that indicates the level of encryption (e.g., message level or IE level).

At 820, the network node determines the level of encryption to selectively encrypt at least a portion of messages between the user plane node and the control plane node. If the network node determines that the connection has message level encryption, then the network node encrypts the payload of all messages between the user plane node and the control plane node at 822.

If the network node determines that the connection has IE level encryption, then the network node encrypts one or more IEs in the messages between the user plane node and the control plane node at 824. Encrypting some, but not all, IEs in the payload enables the network node to conserve computing resources. In one example, the network node negotiates the specific IEs to encrypt while negotiating the connection between the user plane node and the control plane node, i.e., at 810.

If the network node determines that the connection has feature level encryption, then the network node encrypts the payload of messages associated with one or more specific features at 826. Encrypting the payload of some messages (i.e., the messages associated with specific features), but leaving other messages unencrypted enables the network node to conserve computing resources. In one example, the network node negotiates the specific features (e.g., usage reporting, lawful interception, etc.) to encrypt while negotiating the connection between the user plane node and the control plane node, i.e., at 810.

Each pair of nodes may be provisioned with a different set of keys or key pairs. To support a key rotation mechanism, each node may be securely provisioned with multiple keys or key pairs. Each sending node may select the appropriate key or key pair based on an identifier of the session between the sending node and the receiving node. For instance, the sending node and the receiving node may use the same hashing algorithm to determine an index used to select the appropriate key or key pair.

The sending node may hash an identifier (e.g., SEID or TED) to determine the index for the appropriate key or key pair. If the identifier is zero, the sending node may hash a secondary identifier (e.g., a sequence number) to select the appropriate key or key pair to encrypt some or all of the message. Similarly, the receiving node hashes the same identifier using the same algorithm to determine the same index and select the appropriate key or key pair to decrypt the message.

Figure 9:
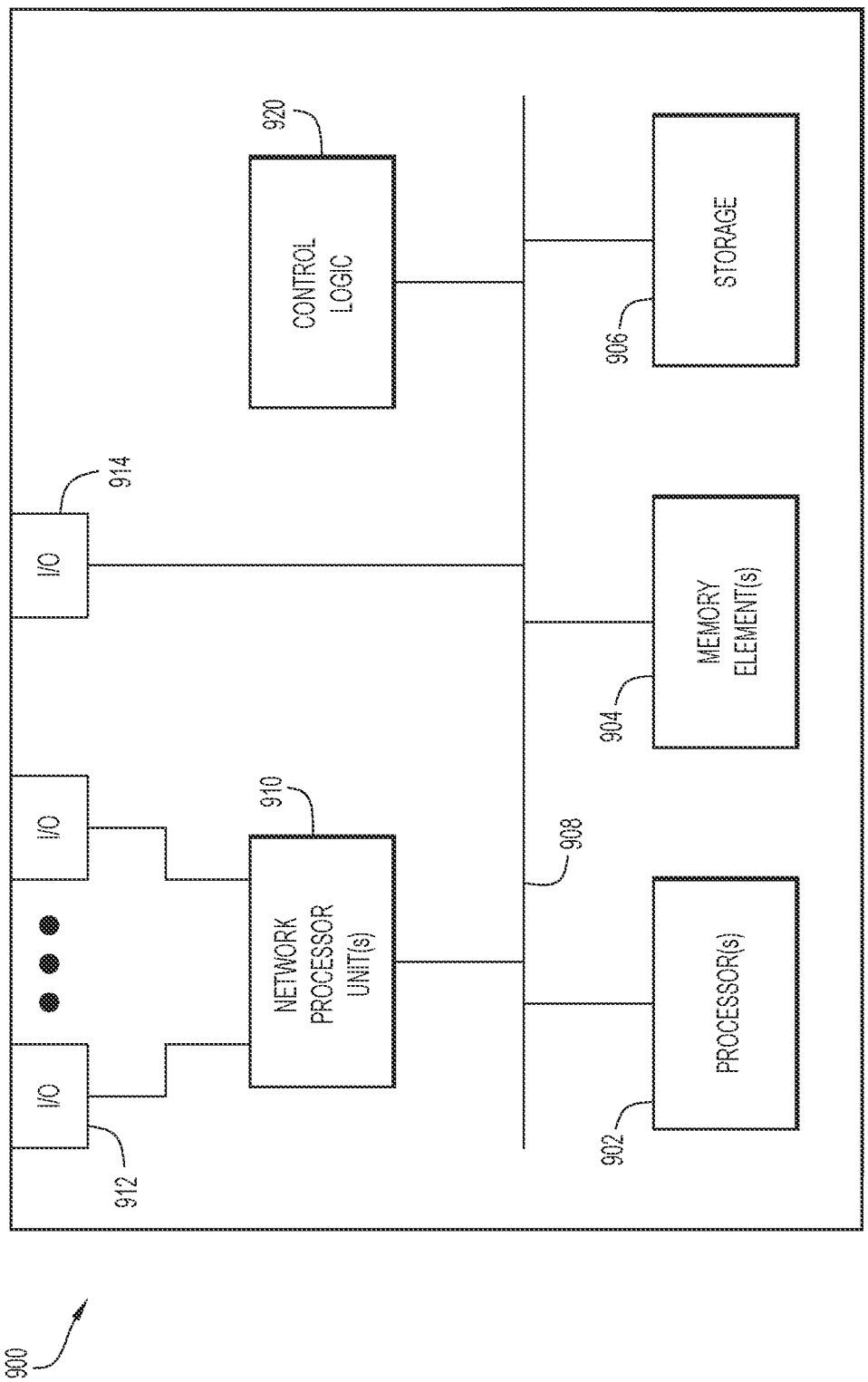
FIG. 9 illustrates a simplified block diagram of a device that may be configured to perform the methods presented herein, according to an example embodiment.

Referring to FIG. 9, FIG. 9 illustrates a hardware block diagram of a computing device 900 that may perform functions associated with operations discussed herein in connection with the techniques depicted in FIGS. 1, 2, 3A, 3B, 4, 5A, 5B, and 6-8. In various embodiments, a computing device, such as computing device 900 or any combination of computing devices 900, may be configured as any entity/entities as discussed for the techniques depicted in connection with FIGS. 1, 2, 3A, 3B, 4, 5A, 5B, and 6-8 in order to perform operations of the various techniques discussed herein.

In at least one embodiment, the computing device 900 may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory element(s) 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, and/or any other I/O port(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to computing device 900. For example, I/O interface(s) 914 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory element(s) 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, the techniques presented herein improve security between network nodes by selectively encrypting important control and/or user plane communications between the nodes, which may be useful when 4G/5G nodes are deployed on a public cloud. Selectively encrypting only the sensitive messages, or portions of messages, may also enable the nodes to conserve computing/hardware resources. As a standards-based solution, the techniques presented herein increasing interoperability between vendors of network systems while also increasing the security of the network system, which may result in improved user experience Further, the use of securely configured public/private keys on control and user plane nodes may help to prevent potential man-in-the-middle (MITM) attacks.

In one form, a method is provided for a network node to selectively encrypt messages in a network system. The method includes negotiating a connection between a user plane node and a control plane node of the network system. The method also includes indicating an encryption level for the connection between the user plane node and the control plane nose. The encryption level is selected from an IE level, a message level, or a feature level. The method further includes selectively encrypting at least a portion of messages between the user plane node and the control plane node based on the encryption level for the connection.

In another form, an apparatus comprising a network interface and a processor is provided. The network interface is configured to communicate with a plurality of computing devices in a wireless network system. The processor is coupled to the network interface, and configured to negotiate a connection between a user plane node and a control plane node of a network system. The processor is also configured to indicate an encryption level for the connection between the user plane node and the control plane node. The encryption level is selected from an IE level, a message level, or a feature level. The processor is further configured to selectively encrypt at least a portion of messages between the user plane node and the control plane node based on the encryption level for the connection. In one instance, the apparatus may be the user plane node or the user plane node.

In still another form, a non-transitory computer readable storage media is provided that is encoded with instructions that, when executed by a processor of network node of a network system, cause the processor to negotiate a connection between a user plane node and a control plane node of a network system. The instructions also cause the processor to indicate an encryption level for the connection between the user plane node and the control plane node. The encryption level is selected from an IE level, a message level, or a feature level. The instructions further cause the processor to selectively encrypt at least a portion of messages between the user plane node and the control plane node based on the encryption level for the connection.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims. For instance, the specific IEs described are used as examples of IEs that are currently defined in 3GPP specifications, but the techniques described herein may be adapted to other IEs that may be defined in current or future network specifications.

What is claimed is:

1. A method comprising:
    negotiating a connection within a network system between a user plane node of the network system and a control plane node of the network system, wherein negotiating the connection includes negotiating an encryption level that indicates which portion of messages between the user plane node and the control plane node that will be encrypted, the encryption level selected from an Information Element (IE) level, a message level, or a feature level; and
    selectively encrypting the portion of messages exchanged within the network system between the user plane node and the control plane node based on the encryption level for the connection.

2. The method of claim 1, wherein negotiating the encryption level for the connection comprises indicating at least one feature associated with a subset of the messages in the connection between the user plane node and the control plane node.

3. The method of claim 2, wherein selectively encrypting the portion of messages comprises:
    indicating the at least one feature in a header of the subset of the messages in the connection between the user plane node and the control plane node; and
    encrypting a payload of the subset of the messages.

4. The method of claim 1, wherein negotiating the encryption level for the connection comprises indicating one or more IEs to be encrypted in the messages between the user plane node and the control plane node.

5. The method of claim 4, wherein selectively encrypting the portion of messages comprises:
    indicating the one or more IEs to be encrypted in a header of the messages between the user plane node and the control plane node; and
    encrypting the one or more IEs in the messages between the user plane node and the control plane node.

6. The method of claim 1, wherein the connection between the user plane node and the control plane node comprises a Packet Forwarding Control Protocol (PFCP) connection or a General Packet Radio Service (GPRS) Tunneling Protocol (GTP) connection.

7. The method of claim 1, further comprising hashing an identifier in a header of the messages between the user plane node and the control plane node to select a cryptographic key to encrypt the portion of messages between the user plane node and the control plane node.

8. An apparatus comprising:
    a network interface configured to communicate with a plurality of computing devices in a network system; and
    a processor coupled to the network interface, the processor configured to:
        negotiate a connection within the network system between a user plane node of the network system and a control plane node of the network system;
        negotiate an encryption level that indicates which portion of messages between the user plane node and the control plane node will be encrypted, the encryption level selected from an Information Element (IE) level, a message level, or a feature level; and
        selectively encrypt the portion of messages exchanged within the network system between the user plane node and the control plane node based on the encryption level for the connection.

9. The apparatus of claim 8, wherein the processor is configured to negotiate the encryption level for the connection by indicating at least one feature associated with a subset of the messages in the connection between the user plane node and the control plane node.

10. The apparatus of claim 9, wherein the processor is configured to selectively encrypt the portion of messages by:

indicating the at least one feature in a header of the subset of the messages in the connection between the user plane node and the control plane node; and encrypting a payload of the subset of the messages.

11. The apparatus of claim 8, wherein the processor is configured to negotiate the encryption level for the connection by indicating one or more IEs to be encrypted in the messages between the user plane node and the control plane node.

12. The apparatus of claim 11, wherein the processor is configured to selectively encrypt the portion of messages by:

indicating the one or more IEs to be encrypted in a header of the messages between the user plane node and the control plane node; and encrypting the one or more IEs in the messages between the user plane node and the control plane node.

13. The apparatus of claim 8, wherein the processor is configured to format the connection between the user plane node and the control plane node as a Packet Forwarding Control Protocol (PFCP) connection or as a General Packet Radio Service (GPRS) Tunneling Protocol (GTP) connection.

14. The apparatus of claim 8, wherein the processor is further configured to hash an identifier in a header of the messages between the user plane node and the control plane node to select a cryptographic key to encrypt the portion of messages between the user plane node and the control plane node.

15. One or more non-transitory computer readable storage media encoded with software comprising computer executable instructions and, when the software is executed on a processor of a network node of a network system, operable to cause a processor to:

negotiate a connection within the network system between a user plane node of the network system and a control plane node of the network system;

negotiate an encryption level that indicates which portion of messages between the user plane node and the control plane node will be encrypted, the encryption level selected from an Information Element (IE) level, a message level, or a feature level; and selectively encrypt the portion of messages exchanged within the network system between the user plane node and the control plane node based on the encryption level for the connection.

16. The one or more non-transitory computer readable storage media of claim 15, wherein the software is further operable to cause the processor to negotiate the encryption level for the connection by indicating at least one feature associated with a subset of the messages in the connection between the user plane node and the control plane node.

17. The one or more non-transitory computer readable storage media of claim 16, wherein the software is further operable to cause the processor to selectively encrypt the portion of messages by:

indicating the at least one feature in a header of the subset of the messages in the connection between the user plane node and the control plane node; and encrypting a payload of the subset of the messages.

18. The one or more non-transitory computer readable storage media of claim 15, wherein the software is further operable to cause the processor to negotiate the encryption level for the connection by indicating one or more IEs to be encrypted in the messages between the user plane node and the control plane node.

19. The one or more non-transitory computer readable storage media of claim 18, wherein the software is further operable to cause the processor to selectively encrypt the portion of messages by:

indicating the one or more IEs to be encrypted in a header of the messages between the user plane node and the control plane node; and encrypting the one or more IEs in the messages between the user plane node and the control plane node.

20. The one or more non-transitory computer readable storage media of claim 15, wherein the software is further operable to cause the processor to hash an identifier in a header of the messages between the user plane node and the control plane node to select a cryptographic key to encrypt the portion of messages between the user plane node and the control plane node.

* * * * *